July 25, 1967     O. KRAUSS ETAL     3,332,526
DRIVE CAM ARRANGEMENT FOR TYPE ACTIONS
Filed Sept. 5, 1963     3 Sheets-Sheet 1

INVENTORS
Otto Krauss
Herbert Pobel

BY Michael S. Striker
ATT

July 25, 1967  O. KRAUSS ETAL  3,332,526
DRIVE CAM ARRANGEMENT FOR TYPE ACTIONS
Filed Sept. 5, 1963  3 Sheets-Sheet 2

INVENTORS
Otto Krauss
Herbert Pobel
BY
Michael S. Striker
Att'y

INVENTORS
Otto Krauss
Herbert Pobet

BY Michael J. Striker 3,332,526
DRIVE CAM ARRANGEMENT FOR TYPE
ACTIONS
Otto Krauss and Herbert Pobel, Nurnberg, Germany, assignors to Max Grundig, Furth, Bavaria, Germany
Filed Sept. 5, 1963, Ser. No. 306,802
Claims priority, application Germany, Sept. 8, 1962,
G 35,886
8 Claims. (Cl. 197—17)

The present invention relates to a drive cam arrangement for type actions, and more particularly to an eccentric drive cam cooperating with an elastic power roll for operating a mechanism, such as a type action, in a typewriter or similar business machine.

It is known to drive the type actions, and other devices, of a typewriter from a continuously rotating power roll which is temporarily coupled with a shoe or cam to start movement of the type action, whereupon the shoe or cam is separated from the power roll and returns to its initial position of rest. Toothed power rolls and power rolls having a resilient peripheral cover consisting, for example, of rubber, are used for this purpose.

When an elastic power roll is used, the drive cam is provided with projections or serrations which during engagement of the resilient surface of the power roll by the drive cam, dig into the resilient material and increase the friction so that no slipping takes place while the type action is driven by the power roll.

The drive cam moves in coupled engagement with the power roll until the drive cam, or a part fixedly secured thereto, engages a stop. The power roll continues its rotation, so that a relative movement between the peripheral surface of the power roll and the stopped drive cam takes place. Such relative movement cannot be avoided even if the stop is made resilient, and consequently the power roll is braked, and its elastic surface subjected to very great friction directly after the drive cam is stopped. This causes the type action to move away from the power roll, and to return in opposite direction to its initial position of rest.

Nevertheless, the wedge action between the cam face of the drive cam and the elastic cover of the power roll, causes a blow and shock which is transferred to the bearings of the power roll and to the stop since the power roll tends to drive for a moment the stopped drive cam. These blows cause a very noticeable noise during the printing of each letter.

The undesired force transmitted by the power roll to the stopped drive cam, before the same is separated from the power roll, is substantial since the teeth or projections of the drive cam are deeply embedded in the elastic cover of the power roll, so that a slipping of the drive cam at the moment at which it is stopped, is not possible. Only when the type action continues its movement and causes the drive cam to move away from the power roll can the disengagement between the power roll and the drive cam take place. However, the type action can move the drive cam away from the power roll only after the drive cam has been stopped, and can move relative to the other parts of the type action.

It is evident that the braking of the power roll by the coupling projections of the drive cam will cause a substantial wear of the rubber surface of the power roll, and will also wear off the extremities of the projections of the drive cam. Particularly the drive cams of type actions associated with very frequently used characters, and the corresponding sections of the power roll engaged by the respective drive cams, are subject to great wear.

When the cooperating portions of the power roll and drive cam of frequently used characters are thus damaged, a slight slipping may take place, and the most frequently used characters may be actuated with a lesser force than other, less frequently used characters.

It is one object of the present invention to overcome these disadvantages of the prior art, and to provide a drive cam cooperating with a power roll without substantial wear of the power roll or drive cam.

Another object of the invention is to provide a drive cam which is reliably coupled with the power roll for the actuation of a type action or similar device, but which permits a sliding of the rotating power roll on the drive cam when the same is stopped.

Another object of the invention is to provide a drive cam with projections which will dig into an elastic power roll during the transmission of force from the power roll to the drive cam, while engagement between the projections of a drive cam with the elastic power roll is prevented at the moment in which the drive cam is stopped.

Another object of the present invention is to provide a drive cam with a cam portion which is suitable for the transmission of force from the power roll to the drive cam, but will permit sliding of the power roll when the drive cam is stopped.

With these objects in view, a drive cam according to one embodiment of the invention includes a rougher portion and a smoother portion. More particularly, the leading cam portion is provided with projections which dig into the elastic cover of a power roll so that the type action is properly accelerated. The trailing cam portion of the drive cam is smoth so that, when the drive cam is stopped, the surface of the power roll can slide on the smooth cam portion without substantial wear of the power roll or drive cam.

A modified embodiment of the invention provides a drive cam with an intermediate cam portion along which diminished projections, preferably of gradually increased pitch, are provided. In this manner a transition between the sharper and higher projections of the leading portion to the smooth trailing portion is accomplished.

Due to the fact that the power roll can slide on the smooth cam portion of a drive cam, blows against the bearings of the power roll, and against the stop are eliminated, together with the noise produced by such blows. The sliding of a power roll on a smooth surface cannot cause the damage produced by sliding on sharp serrations according to the prior art.

Tests have shown that a power roll cooperating with drive cams according to the present invention has a three times longer span of life than power rolls used in conventional constructions.

Consequently, it is also an object of the present invention to increase the useful life of a power roll, and to provide a typewriter whose operation is less noisy than the operation of conventional typewriters.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 1:
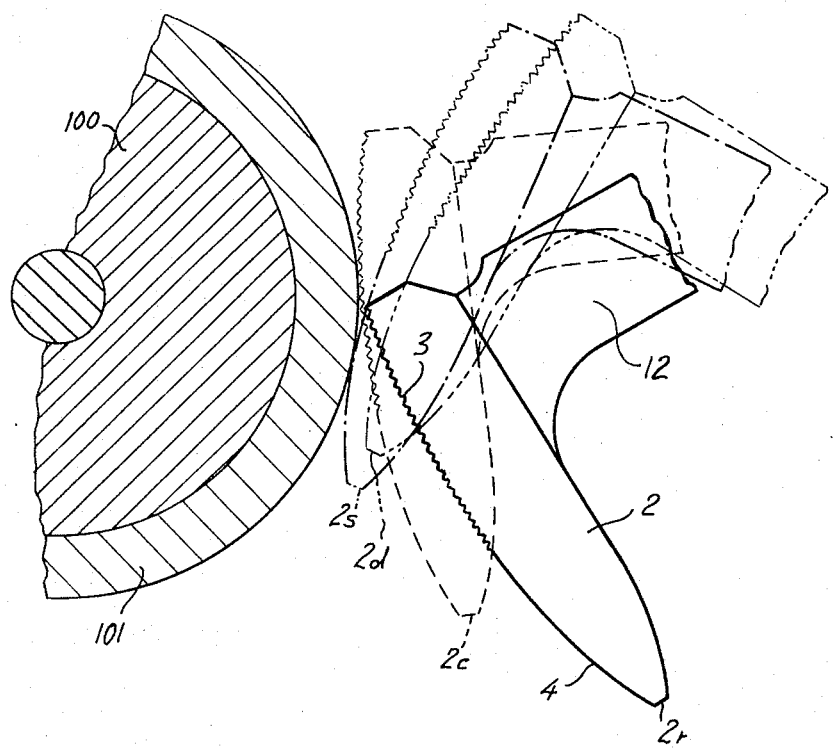
FIG. 1 is a fragmentary side view, partially in section, and illustrating several operational positions of a drive cam on an enlarged scale.

Conventional parts of the typewriter are omitted in the drawings for the sake of clarity, and the improved type lever action and drive cam arrangement of the invention is a part of the typewriter described in the copending application Ser. No. 82,285 filed by Otto Krauss et al. on Jan. 12, 1961, now Patent No. 3,225,884 issued Dec. 28, 1965.

Figure 3:
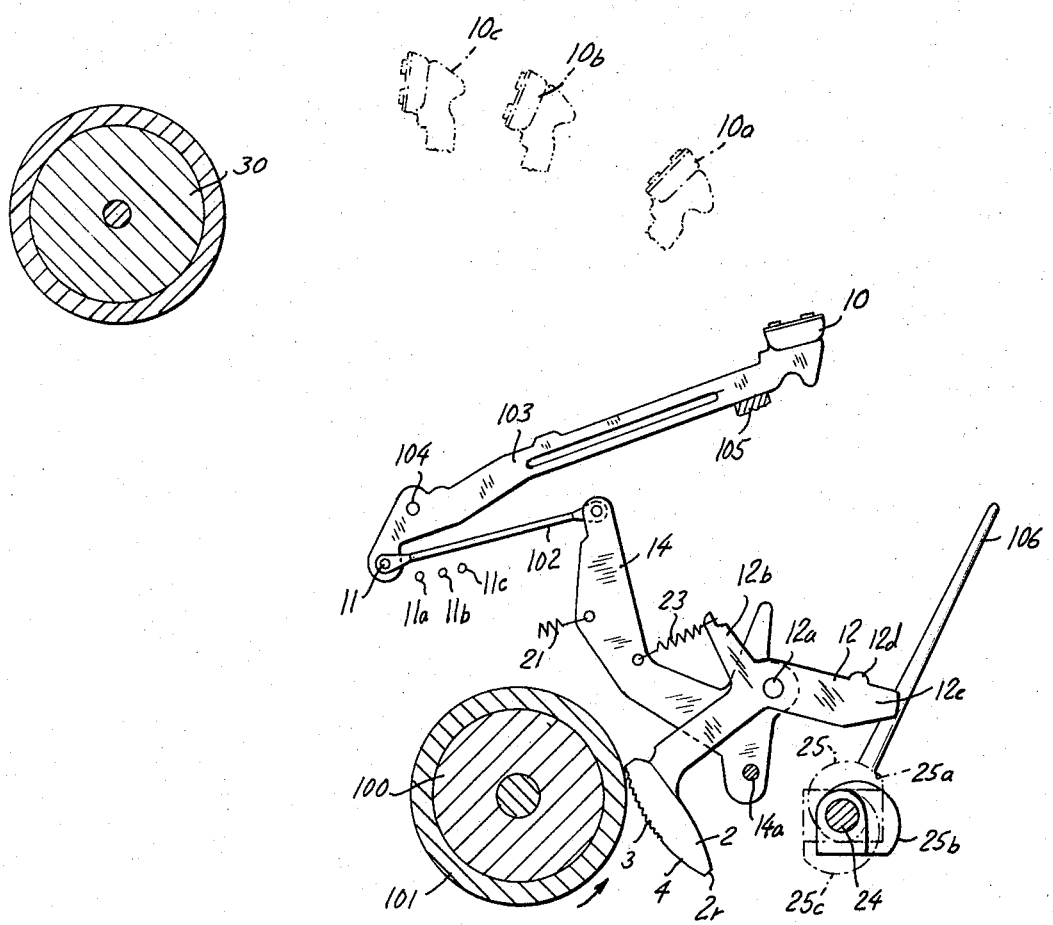
FIG. 3 is a fragmentary side view, partially in section, illustrating several adjusted positions of a type lever action provided with a drive cam according to the present invention.

Referring now to the drawings, and more particularly to FIG. 3, a power roll 100 has a rubber cover 101 and is continuously rotated by a motor, not shown. The power roll 100 cooperates with a drive cam 2 which preferably consists of a synthetic plastic material, and is permanently secured to a lever member 12 which is mounted for turning movement on a pivot pin 12a which is secured to a lever means 14. The arm 12b is connected by a spring 23 to lever means 14, while a spring 21 is secured to a frame part, not shown, and to lever means 14 to urge the same to turn in counter clockwise direction to the illustrated position of rest. Spring 23 is designed to hold lever 12 with drive cam 2 in the illustrated position of rest in which the cam face of drive cam 2 is slightly spaced from the peripheral surface of cover 101 of power roll 100.

A connecting rod 102 is articulated to the free end of lever means 14, and connected to the type bar 103 by a pivot means 11. Type bar 103 is turnable about a shaft 104 on which a series of type bars, not shown, is supported. Type bar 103 carries a type 10 and rests on an abutment 105 under the action of spring 21.

Figure 4A:
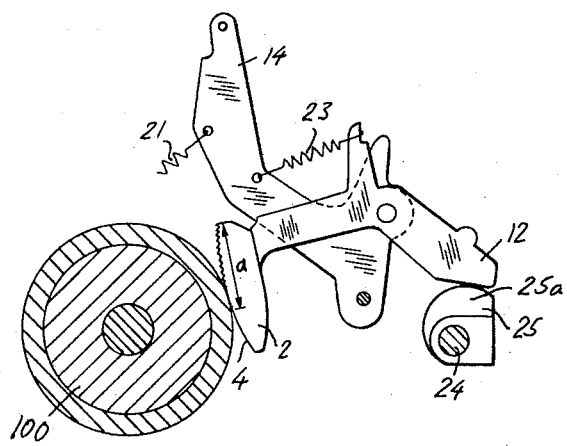
FIG. 4a is a fragmentary side view, partly in section, illustrating a first adjusted position of a drive cam arrangement according to the present invention.
Figure 4B:
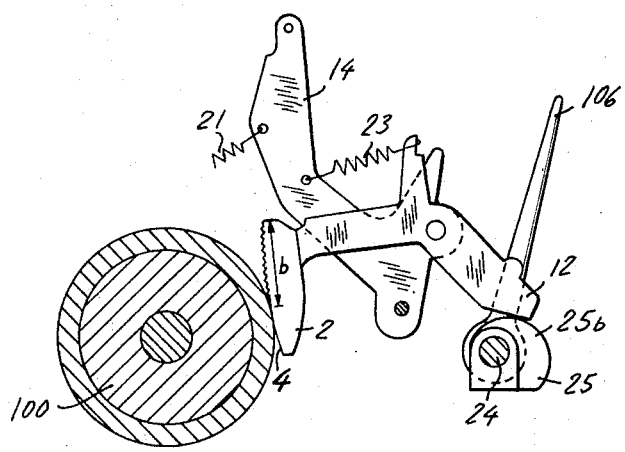
FIG. 4b is a fragmentary side view, partly in section, illustrating a second adjusted position of the drive cam arrangement.
Figure 4C:
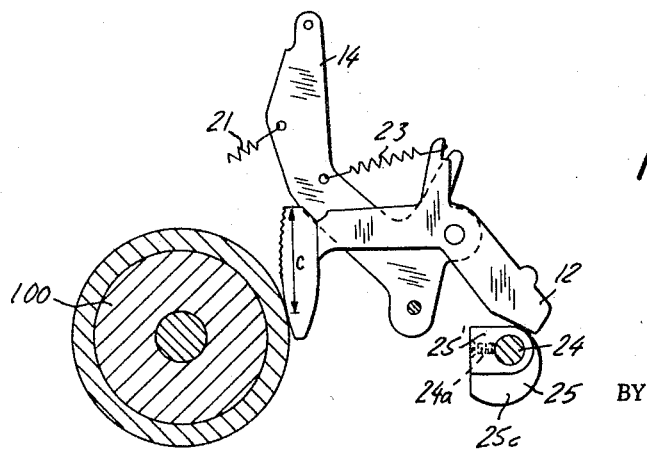
FIG. 4c is a side view, partially in section, and illustrating a third adjusted position of a drive cam arrangement according to the present invention.

A shaft 24 is mounted in bearings, not shown, on the frame of the machine, and carries a plurality of eccentric stops 25. A handle 106 is secured to shaft 24 and has an end portion projecting out of the casing of the machine in the region of the keyboard so that the operator may turn shaft 24 with all stops thereon for the purpose of adjusting the impact force of the type bar, as will be explained hereinafter in greater detail. All eccentric stops may be in the position of FIG. 4a, or in the position of FIG. 4b, or in the position of FIG. 4c, or in intermediate adjusted positions. Three positions 25a, 25b, 25c of the adjustable stop 25, corresponding respectively to FIGS. 4a, 4b and 4c, are illustrated in FIG. 3. Arm 12c of lever 12 cooperates with the adjustable stop 25. Each arm 12c has a projection 12d which cooperates with a key lever, not shown.

Figure 2:
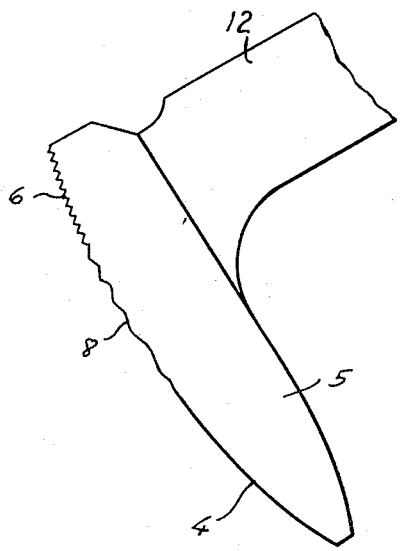
FIG. 2 is a fragmentary side view illustrating a modified drive cam on an enlarged scale.

As best seen in FIG. 1, drive cam 2 has a cam portion 3 formed with projections and recesses, and a cam portion 4 which is smooth and which has a greater radius of curvature than cam portion 3. In the modified construction of FIG. 2, a drive cam 5 has a cam portion 6 formed with sharp projections and recesses, a smooth portion 4, and an intermediate portion 8 in which the pitch of the projections is gradually increased, and in which the height of the projections may be gradually decreased, so that the projections of cam portion 8 are diminished as compared with the projections on cam portion 6 and constitute a transition between the serrated cam portion 6 and the smooth cam portion 4. In the position of rest shown in FIGS. 1 and 3 the end of the leading cam portion 3 is slightly spaced from the surface of the rubber cover 101 of power roll 100 which continuously rotates. When a key, not shown, is depressed by the operator, a part, not shown, moves downwardly with the key lever, engages projection 12d, and causes turning movement of lever 12 with drive cam 2 about pivot 12a in clockwise direction so that the curved eccentric serrated cam portion 3 engages the surface of the power roll whereby drive cam 2 is coupled to the power roll causing turning of lever 12 in clockwise direction with arm 12c moving toward stop 25. During such turning movement, the projections on the eccentric leading cam portion 3 dig deeply into the elastic cover 101, and drive cam 2 is reliably coupled to power roll 100 in the position 2c shown in FIG. 1.

During continued turning movement of drive cam 2, the smooth trailing cam portion 4 moves to a position engaging power roll 100, but the coupling engagement is nevertheless maintained since the curved eccentric cam portion 4 presses against the resilient surface of the power roll.

The above described turning movement of drive cam 2 with lever 12 is transmitted by spring 23 to lever means 14 which turns in clockwise direction, and causes turning movement of type bar 103 in counterclockwise direction so that the type 10 moves toward platen 30.

When arm 12c of lever 12 engages stop 25, drive cam 2 is stopped in the position 2s shown in FIG. 1. The power roll, continuing its rotation, slides on the smooth surface of cam portion 4, and since the serrations of the leading cam portion 3 no longer engage the resilient cover 101, no damage can be done to the serrations or to cover 101.

Lever means 14 and type bar 103 continue to move due to inertia, and this causes pivot 12a to move with lever means 12 along a circular path about shaft 14a on which lever means 14 is mounted. Drive cam 2 moves with lever 12 to the right as viewed in FIG. 3 to a position 2d, shown in FIG. 1, in which the drive cam is disengaged from the power roll. Although lever means 14 continues to move in clockwise direction due to the action of inertia, spring 23 turns lever 12 with the disengaged drive cam 2 in counterclockwise direction back to the position of rest 2r shown in FIGS. 1 and 3. Shortly thereafter type 10 hits platen 30, and returns in clockwise direction to the position illustrated in FIG. 3 under the action of spring 21.

The above described operation takes place irrespective of the position of the adjustable stop 25. However, it is evident that arm 12c will be sooner stopped in the position 25a than in the positions 25b and 25c.

Assuming that shaft 24 has been turned by the operator to a position in which the stops 25 are in the position 25a, the distance between stop 25 and the arm 12c is the shortest, and lever 12 with drive cam 2 will be stopped in the position illustrated in FIG. 4a in which drive cam 3 is in a position in which the rough serrated coupling portions thereof has just passed beyond the point of engagement between drive cam 2 and power roll 100 so that the leading end of the smooth cam portion 4 will be in contact with the power roll. Consequently, the surface of the power roll will slide on the smooth cam portion 4, but the drive cam has been in coupling engagement with the power roll only for a distance a. Thereupon, drive cam 2 is disengaged from power roll 100, and at this moment, pivot 11 of type bar 103 is in the position 11a and type 10 is in the position 10a shown in FIG. 3.

Since the type action was driven by the power roll only for a short time and during turning of the type bar through a small angle, the impact force exerted by the type on the platen will be small since the inertia of the type bar is used up by the counteraction of spring 21. Consequently, light impressions will be made on the sheet on the platen, as is desired, for example, for making only one carbon copy.

When stops 25 are turned by the operator to th position 25b shown in FIG. 3 and FIG. 4b, drive cam 2 travels through a greater angle before stop 25 is engaged by arm 12c and the smooth cam portion 4 separates from power roll 100. At this moment, pivot 11 is in the position 11b and type 10 is in the position 10b shown in FIG. 3, while drive cam 2 was coupled with the power roll for the length $b$ of its cam face. Due to the fact that the type action was driven for a longer time and through a greater angle by a power roll, the impact force on the platen 30 is greater.

In the position 25c, lever 12 with drive cam 2 travels the greatest angle before being stopped and disengaged from power roll 100, so that pivot 11 is in the position 11c, and type 10 is in the position 10c where the type action is disengaged from the power drive. In this adjusted position of stop 25, the greatest impact force will be produced, as is desired for making a great number of carbon copies. The cam face of drive cam 2 is in coupling engagement with the power roll for the greatest length $c$. Each stop 25 has a lateral projection 25', and a screw 24a is located in the thus formed thicker portion of stop 25 to secure the stop to shaft 24. When the screw is loosened, the respective stop 25 can be individually adjusted. In this manner, it is possible to produce slightly different impact forces for different type lever actions, the difference between the impact forces remaining the same in the three operator adjusted positions described with reference to FIGS. 4a, 4b and 4c. A type representing a period will need a lesser impact force than the type representing a character with a large surface, such as $w$ or $m$.

It will be understood that each of the elements described above or two or more together, may also find a useful application in other types of devices driven by a power roll differing from the types described above.

While the invention has been illustrated and described as embodied in a drive cam having a serrated cam portion and a smooth cam portion and being stopped during engagement of the smooth cam portion by a power roll, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a typewriter, in combination, a power roll; a type action including an actuated member having a drive cam cooperating with said power roll and including a leading cam portion formed with projections and recesses and a trailing cam portion having a smooth surface; means mounting said actuated member movable from an inactive position in which said drive cam is spaced from said power roll first into an intermediate operative position in which said leading cam portion engages with its projections said power roll and then into a final operative position in which said trailing cam portion engages with its smooth surface said power roll; and stop means for stopping movement of said drive cam in said final operative position while said power roll is in contact with said trailing cam portion so as to permit said power roll to slide on said smooth surface of said trailing cam portion during continued rotation thereof, whereby excessive wear of power roll and drive cam is avoided.

2. In a typewriter, in combination, a power roll; a type action including lever means mounted for turning movement about an axis and a drive cam mounted on said lever means for turning movement about another axis and cooperating with said power roll so that said drive cam and therethrough said lever means are turned in one direction of rotation by said power roll, said cam including a leading cam portion formed with projections and recesses and a trailing smooth cam portion; stop means for stopping movement of said drive cam while said power roll is in contact with said smooth cam portion so as to permit said power roll to slide on said smooth cam portion during continued rotation thereof while said lever means continues its turning movement in said one direction due to inertia whereby said drive cam moves with said lever means to a position spaced from said power roll; and means for turning said drive cam in said spaced position in a direction opposite to said one direction to a position of rest.

3. In a typewriter, in combination, a power roll; a type action including lever means mounted for turning movement about an axis and a drive cam mounted on said lever means for turning movement about another axis and cooperating with said power roll so that said drive cam and therethrough said lever means are turned in one direction of rotation by said power roll, said cam including a leading cam portion formed with projections and recesses and a trailing smooth cam portion; stop means for stopping movement of said drive cam while said power roll is in contact with said smooth cam portion so as to permit said power roll to slide on said smooth cam portion during continued rotation thereof while said lever means continues its turning movement in said one direction due to inertia whereby said drive cam moves with said lever means to a position spaced from said power roll; and spring means connecting said lever means with said drive cam for turning said drive cam in said spaced position in a direction opposite to said one direction to a position of rest.

4. In a typewriter as set forth in claim 1, wherein said stop means are adjustable for stopping movement of said drive cam while said power roll is in contact with different points of said trailing cam portion so that said power roll is in contact with said leading cam portion and with parts of said trailing cam portion of different selective lengths before said drive cam is stopped.

5. In a typewriter as set forth in claim 1, wherein said cam portions are curved and wherein said trailing cam portion has a greater radius of curvature than said leading cam portion.

6. In a typewriter as set forth in claim 1, wherein said power roll is elastic at least on the peripheral surface thereof.

7. In a typewriter as set forth in claim 1, and including an intermediate cam portion between said leading and said trailing cam portions, said intermediate cam portion being formed with gradually diminished projections and recesses.

8. In a typewriter as set forth in claim 1, and including an intermediate cam portion between said leading and said trailing cam portions, said intermediate cam portion being formed with alternate projections and recesses of gradually increased pitch.

References Cited

UNITED STATES PATENTS

| | | | |
|---|---|---|---|
| 1,569,389 | 1/1926 | Paersch | 197—17 X |
| 1,963,285 | 6/1934 | Woodward | 197—17 X |
| 2,528,450 | 10/1950 | Petz | 197—17 |
| 2,750,022 | 6/1956 | Long | 197—17 |
| 2,830,688 | 4/1958 | Wade | 197—183 X |
| 2,900,062 | 8/1959 | Nitschke | 197—17 |
| 2,938,615 | 5/1960 | Donnan et al. | 197—17 |
| 3,011,617 | 12/1961 | Ryan et al. | 197—17 |
| 3,179,226 | 4/1965 | Bolton | 197—17 |

ROBERT E. PULFREY, *Primary Examiner.*

E. T. WRIGHT, *Assistant Examiner.*